Aug. 7, 1923.
D. W. MITCHELL
1,463,902
MEANS FOR DISPENSING SEMIFLUID MATERIALS
Filed Dec. 2, 1921
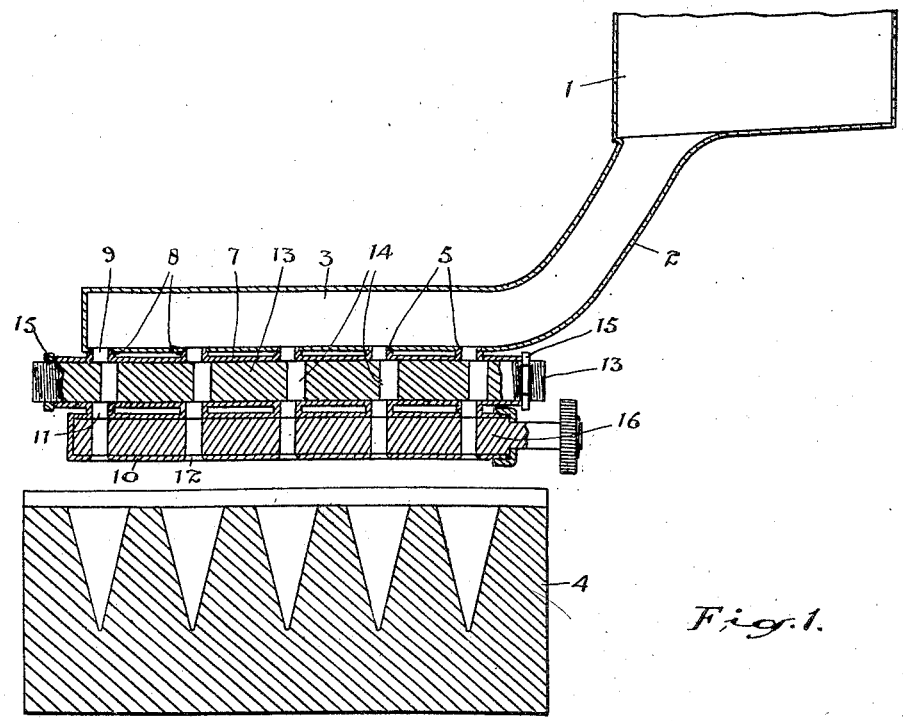
Fig.1.
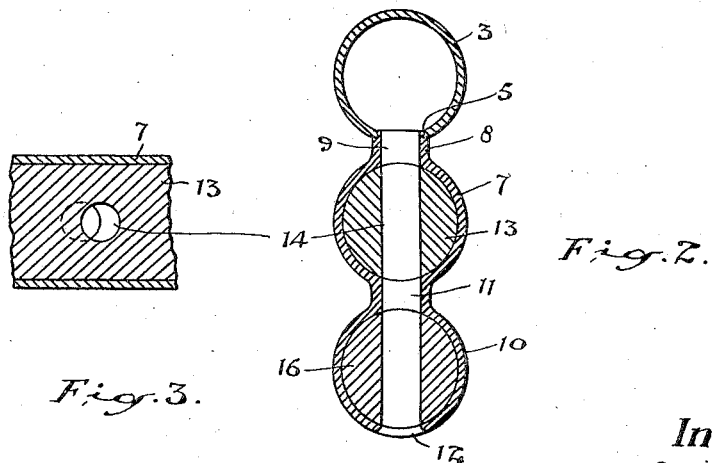
Fig.2.
Fig.3.
Inventor.
David W. Mitchell
by H.J.S. Dennison
atty.

Patented Aug. 7, 1923.

1,463,902

UNITED STATES PATENT OFFICE.

DAVID W. MITCHELL, OF TORONTO, ONTARIO, CANADA.

MEANS FOR DISPENSING SEMIFLUID MATERIALS.

Application filed December 2, 1921. Serial No. 519,546.

*To all whom it may concern:*

Be it known that I, DAVID W. MITCHELL, a subject of the King of Great Britain, and resident of the city of Toronto, county of York, Province of Ontario, in the Dominion of Canada, have invented certain new and useful Improvements in Means for Dispensing Semifluid Materials, described in the following specification and illustrated in the accompanying drawings, that form part of the same.

The objects of this invention are to accurately control the flow of semi-fluid materials by dispensing in definite quantities such as a flow of batter in automatic baking machines and particularly machines for making ice cream cones so that a definite quantity of batter will be deposited directly in the mould receptacle as the mould passes beneath the dispensing member and will not be distributed over the portion of the mould member not actually moulding the article.

A further object is to prevent the waste of the batter material.

The principal feature of the invention consists in the novel construction and arrangement of a rotating dispensing member having transverse passages therethrough communicating with passages leading from a tubular batter supply member and in the arrangement of a control member between the supply and the dispensing member to regulate the speed of flow of the batter.

In the drawings, Figure 1 is a vertical longitudinal sectional view of a dispensing member constructed in accordance with this invention, shown arranged above a mould.

Figure 2 is an enlarged vertical sectional view through the line 2—2 of Figure 1 and Figure 3 is an enlarged horizontal sectional view through a portion of the batter control member.

In the operation of automatic baking machines where a batter is deposited in a mould, it is important that the amount of batter delivered be accurately regulated to obtain uniformity in the produced article and also to avoid the overflowing of the batter from the mould. It is also necessary to deposit the batter rapidly so that it will not string out and be carried over the face of the mould as the mould passes thereunder.

In order to accomplish this result, I have devised a mechanism wherein the batter is placed in a receptacle 1 and a gravity feed tube 2 leads downwardly therefrom having a horizontal portion 3 extending over the mould 4 which is adapted to pass thereunder. The tube 3 is formed with holes 5 in the underside adapted to register with the mould recesses 6.

Attached to the tube 3 in any suitable manner is a cylindrical casing 7, which is here shown with nipples 8 extending into the holes 5, said nipples having circular holes 9 therethrough.

A cylindrical casing 10, preferably forming part with the casing 7, is arranged below the casing 7 and this casing is formed with holes 11 in the top side and holes 12 in the bottom side arranged in register with the holes 9 so that there is a straight passage through from the feed tube 2 to the bottom holes 12.

Within the casing 7 is arranged a bar member 13 here shown cylindrical in form, through which extend a plurality of holes 14 corresponding in diameter and spacing with the holes 9 in the nipples 8. The bar 13 is adapted to be adjusted longitudinally or it may of course be rotated to accomplish the same result so as to partially cut off the holes 9, thereby regulating the volume of the flow of the batter through the nipples. The bar 13 is here shown threaded at the end and provided with adjusting nuts 15 to lock the said bar in the desired adjusted position.

Within the casing 10 is arranged the rotatable member 16 which is provided with transverse holes 17 registering with the holes 11 and 12. This member is provided with an extension 18 carrying a gear wheel 19 by means of which the device is rotated.

At the proper period in the movement of the machine when the moulds come under the dispensing device, the member 16 is rotated to open the holes communicating with the batter tube and the batter under gravity pressure flows through and is deposited in the mould receptacles. The rotation of the member 16 cuts off the flow of the batter at the proper period before the stream of batter will have reached the terminal edge of the mould cavities, consequently it will not be distributed over the mould surface and it will not be wasted.

The volume of flow in the limited period of the passage of the mould beneath the dispenser can be accurately regulated by operating the bar 13 and when it is once set at the required position for a certain class of goods, it will continue to regulate the flow uniformly.

What I claim as my invention is:—

1. A dispensing device, comprising, a container, a horizontally arranged feed tube leading from said container having openings leading therefrom, adjustable means for regulating the size of said openings, and a rotating member adapted to cut off the flow of the material.

2. A dispensing device, comprising, a container, a horizontal feed tube leading from said container having openings leading therefrom, a cylindrical casing arranged parallel with said tube having openings in both sides thereof registering with the openings in said tube, a rotary member arranged in said cylindrical chamber having openings therethrough registering with the openings in the casing, and slidable means interposed between said feed tube and said casing for regulating the flow of material therethrough.

3. A dispensing device, comprising, a container, a tube leading from said container having openings leading therefrom, a casing secured to said tube having a cylindrical chamber with openings in both sides thereof registering with the openings in said tube, a rotary member arranged in said cylindrical chamber having openings therethrough registering with the openings in the casing, a bar having openings therethrough adapted to register with the openings in said tube and said casing, said bar being adjustably arranged between said tube and said casing, and means for holding said bar in adjusted positions.

4. A dispensing device, comprising, a container, a tube leading from said container having openings leading therefrom, a casing secured to said tube having a cylindrical chamber with openings in both sides thereof registering with the openings in said tube, a rotary member arranged in said cylindrical chamber having openings therethrough registering with the openings in the casing, a bar slidably arranged between said tube and said casing and having a plurality of openings therethrough corresponding in size and number with the openings in the tube, said bar being adapted to be moved longitudinally to regulate the size of the openings leading from said tube, and means for securing said bar in adjusted positions.

DAVID W. MITCHELL.